United States Patent
Osborn et al.

(10) Patent No.: US 11,803,288 B1
(45) Date of Patent: Oct. 31, 2023

(54) SYSTEMS AND METHODS FOR SHARING DATA

(71) Applicant: Capital One Services, LLC, McLean, VA (US)

(72) Inventors: Kevin Osborn, Newton Highlands, MA (US); Jeffrey Rule, Chevy Chase, MD (US); Bryant Yee, Silver Springs, MD (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 0 days.

(21) Appl. No.: 17/941,126

(22) Filed: Sep. 9, 2022

(51) Int. Cl.
| | | |
|---|---|---|
| *G06F 3/048* | (2013.01) | |
| *G06F 3/04817* | (2022.01) | |
| *G06F 3/0486* | (2013.01) | |
| *H04W 64/00* | (2009.01) | |
| *H04W 76/15* | (2018.01) | |
| *G06Q 20/34* | (2012.01) | |

(52) U.S. Cl.
CPC ........ *G06F 3/04817* (2013.01); *G06F 3/0486* (2013.01); *H04W 64/003* (2013.01); *H04W 76/15* (2018.02); *G06Q 20/351* (2013.01)

(58) Field of Classification Search
CPC .............. G06F 3/04817; G06F 3/0486; H04W 64/003; H04W 76/15; G06Q 20/351
See application file for complete search history.

(56) References Cited

U.S. PATENT DOCUMENTS

| | | |
|---|---|---|
| 5,801,700 A | 9/1998 | Ferguson |
| 2010/0078471 A1* | 4/2010 | Lin .......................... G06Q 40/02 235/379 |
| 2014/0040128 A1* | 2/2014 | Park ...................... G07F 9/0235 705/42 |
| 2018/0374076 A1* | 12/2018 | Wheeler ............ G06Q 20/3224 |
| 2020/0249819 A1* | 8/2020 | Berquam .............. G06T 19/006 |
| 2021/0012339 A1 | 1/2021 | Rafferty et al. |
| 2021/0056552 A1* | 2/2021 | Murray ................ G06Q 20/085 |

OTHER PUBLICATIONS

Website: https://www.sharedrop.io/rooms/f6580847-6c9c-43c3-9aa5-d9895c7e320b (Apr. 21, 2014).
(Continued)

*Primary Examiner* — Aleksey Olshannikov
(74) *Attorney, Agent, or Firm* — TROUTMAN PEPPER HAMILTON SANDERS LLP; Christopher J. Forstner; John A. Morrissett

(57) ABSTRACT

Disclosed embodiments may include a system for sharing data. The system may direct a first user device to establish a respective wireless connection with second user devices. The system may cause the first user device to display, via a GUI, icons respectively corresponding to the second user devices. The system may track respective locations of the second user devices relative to the first user device, and may modify the GUI by repositioning the icons in the GUI based on the respective locations of each second user device relative to the first user device. The system may receive a request, from the first user device, to transfer data to a second user device of the second user devices based on a current position of an icon associated with the second user device in the modified GUI. The system may then transfer the data to the second user device.

20 Claims, 4 Drawing Sheets

(56) References Cited

OTHER PUBLICATIONS

MacOS User Guide: Use AirDrop on your Mac to send files to devices near you; accessed via https://support.apple.com/guide/mac-help/send-files-between-devices-with-airdrop-mh35868/12.0/mac/12.0 (Nov. 25, 2021).

Clover, Juli, "Universal Control: Everything You Need to Know," Mac Rumors, accessed via https://www.macrumors.com/guide/universal-control/ (May 12, 2022).

\* cited by examiner

SYSTEMS AND METHODS FOR SHARING DATA

The disclosed technology relate to systems and methods for sharing data. Specifically, this disclosed technology relates to sharing data between users based on respective locations of users' associated user devices.

BACKGROUND

With the increasing prevalence of cash-less transactions, individuals often seek ways to share data, such as transaction data, with other individuals. For example, a parent may transfer money or some form of payment method to a child such that the child may independently initiate and conduct a transaction.

Accordingly, there is a need for improved systems and methods for sharing data. Embodiments of the present disclosure may be directed to this and other considerations.

SUMMARY

Disclosed embodiments may include a system for sharing data. The system may include one or more processors, and memory in communication with the one or more processors and storing instructions that, when executed by the one or more processors, are configured to cause the system to share data. The system may direct a first user device to establish a respective wireless connection with a plurality of second user devices. The system may cause the first user device to display, via a graphical user interface (GUI), a plurality of icons respectively corresponding to the plurality of second user devices. The system may track respective locations of the plurality of second user devices relative to the first user device. The system may modify the GUI by repositioning one or more of the plurality of icons in the GUI based on the respective locations of each second user device relative to the first user device. The system may cause the first user device to display the modified GUI. The system may receive a request, from the first user device, to transfer data to a second user device of the plurality of second user devices based on a current position of an icon associated with the second user device in the modified GUI. Responsive to receiving the request, the system may transfer the data to the second user device.

Disclosed embodiments may include a system for sharing data. The system may include one or more processors, and memory in communication with the one or more processors and storing instructions that, when executed by the one or more processors, are configured to cause the system to share data. The system may direct a first user device to establish a wireless connection with a second user device. The system may cause the first user device to display, via a GUI, a first icon corresponding to the second user device. The system may track a location of the second user device relative to the first user device. The system may modify the GUI by repositioning the first icon in the GUI based on the location of the second user device relative to the first user device. The system may cause the first user device to display the modified GUI. The system may receive a request, from the first user device, to transfer data to the second user device based on a current position of the first icon in the modified GUI. Responsive to receiving the request, the system may cause the first user device to display, via the modified GUI, a second icon corresponding to the data. The system may receive a user input from the first user device via the modified GUI, the user input comprising a movement of the second icon in a direction of the current position of the first icon corresponding to the second user device. Responsive to receiving the user input, the system may transfer the data to the second user device.

Disclosed embodiments may include a first user device for sharing data. The first user device may include one or more processors, and memory in communication with the one or more processors and storing instructions that, when executed by the one or more processors, are configured to cause the first user device to share data. The first user device may establish a wireless connection with a second user device. The first user device may display, via a GUI, a first icon corresponding to the second user device. The first user device may receive location data associated with the second user device. The first user device may reposition the first icon in the GUI based on the location data. The first user device may receive a first user input, via the GUI, indicating a request to transfer data to the second user device. Responsive to receiving the first user input, the first user device may display, via the GUI, a second icon corresponding to the data. The first user device may receive a second user input, via the GUI, comprising a movement of the second icon in a direction of a current location of the first icon. Responsive to receiving the second user input, the first user device may transmit the request to a server. The first user device may receive, from the server, an indication that the data has been transferred to the second user device. Responsive to receiving the indication, the first user device may display, via the GUI, a notification indicating the data has been transferred to the second user device.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
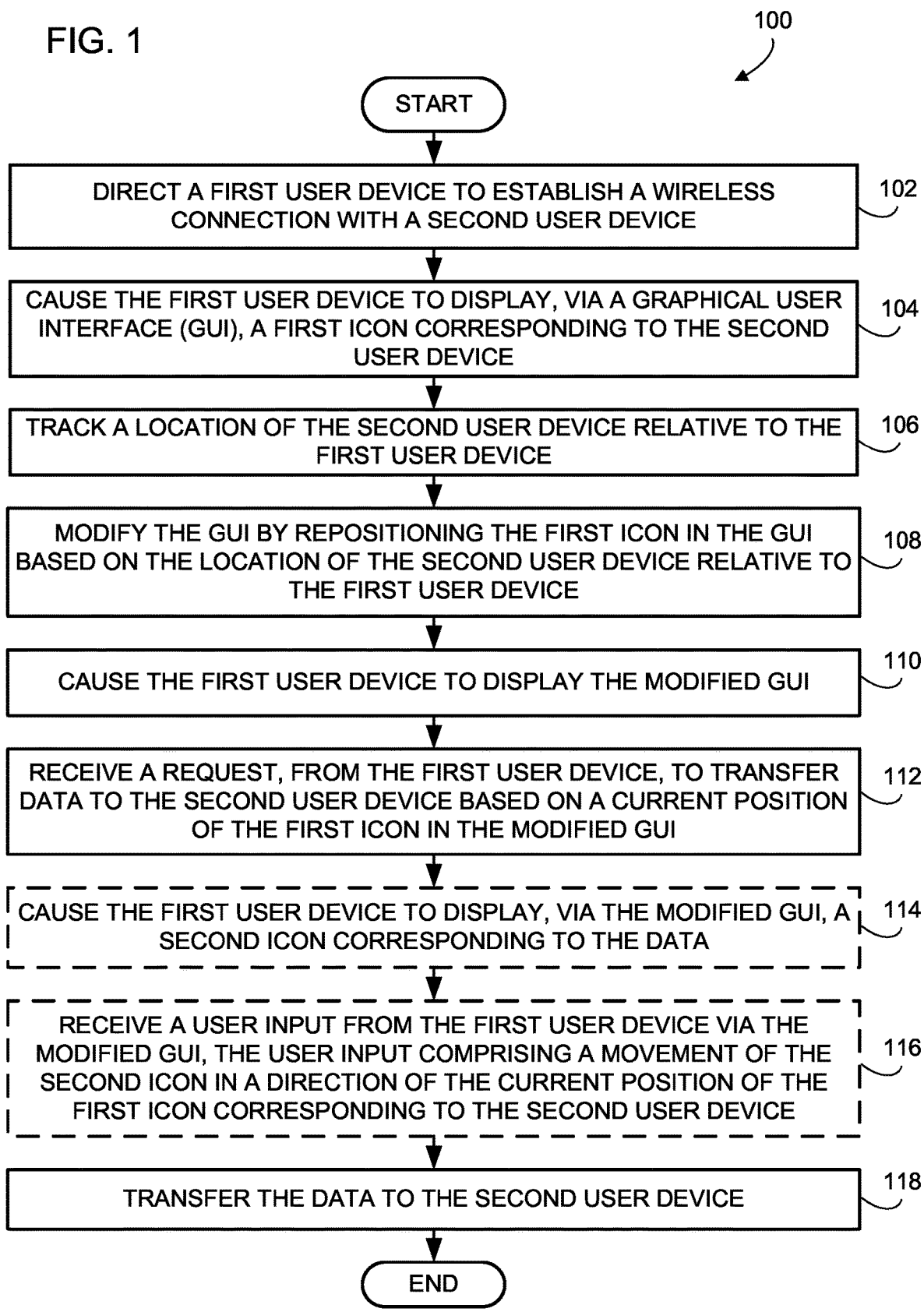
FIG. 1 is a flow diagram illustrating an exemplary method for sharing data in accordance with certain embodiments of the disclosed technology.

Traditional systems and methods for sharing data, such as via email, mobile applications, and the like, can present security risks, such as ensuring the data ends up with the correct individual. Even while these systems and methods may include a form of identification of a transferee, such as an email address, phone number, username, etc., a transferor may not be fully confident that the data ends up in the correct hands.

Accordingly, examples of the present disclosure may provide for the use of a customized GUI configured to dynamically display respective locations of devices associated with individuals to increase the accuracy of data transfers. The systems and methods disclosed herein may provide for continuously tracking these respective locations, continuously modifying a GUI to dynamically display the respective locations, and receiving a request from a first user to transfer data to a second user, the request based on a current position of an icon associated with the second user in the modified GUI. Based on receiving the request, the systems and methods disclosed herein may provide for the transfer of the data to the second user device.

The systems and methods described herein may utilize, in some instances, graphical user interfaces (GUIs), which are necessarily rooted in computers and technology. Graphical user interfaces are a computer technology that allows for user interaction with computers through touch, pointing devices, or other means. The present disclosure details establishing of a wireless connection between a first user device and one or more second user devices, continuously tracking respective locations of the second user device(s) relative to the first user device, displaying the respective locations via a GUI of the first user device, continuously modifying the GUI by repositioning one or more icons in the GUI based on the respective locations of each second user device relative to the first user device, and facilitating a transfer of data between the first user device and a second user device based on that second user device's associated icon's current position in the modified GUI. This, in some examples, may involve using location-based input data to dynamically change the GUI so that a first user device may transfer data to a second user device based on the second user's location relative to the first user. Using a GUI in this way may allow the system to facilitate the secure and accurate transfer of data between devices. This is a clear advantage and improvement over prior technologies that do not provide for the transfer of data based on user device location, and as such, may present an increased security risk. The present disclosure solves this problem by continuously tracking the location of user devices relative to one another, and dynamically displaying such locations via a GUI such that a first user can ensure data is transferred to the correct second user device. Furthermore, examples of the present disclosure may also improve the speed with which computers can share data. Overall, the systems and methods disclosed have significant practical applications in the data sharing field because of the noteworthy improvements of location tracking and continuous GUI modification, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a flow diagram illustrating an exemplary method 100 for sharing data, in accordance with certain embodiments of the disclosed technology. The steps of method 100 may be performed by one or more components of the system 400 (e.g., user tracking system 320 or web server 410 of data sharing system 408, or user device 402 and/or user device(s) 404), as described in more detail with respect to FIGS. 3 and 4.

In block 102, the user tracking system 320 may direct a first user device (e.g., user device 402) to establish a wireless connection with a second user device (e.g., user device 404). The wireless connection may include, for example, a local wireless network, or a global network (e.g., owned and/or operated by an entity). The wireless connection may include an encrypted channel such that the transfer of data between devices, as discussed herein, may occur via a secure route. In some embodiments, directing the first user device may include, for example, transmitting a prompt to the first user device (e.g., a push notification, email, text message, in-application notification, etc.) indicating the first user device should connect wirelessly with a second user device. In some embodiments, the system may direct the first user device (e.g., user device 402) to establish a respective wireless connection with a plurality of second user devices (e.g., user devices 404).

In block 104, the user tracking system 320 may cause the first user device to display, via a GUI, a first icon corresponding to the second user device. For example, the first icon may include an image (e.g., a photograph), or an icon (e.g., an avatar) associated with a user of the second user device. In some embodiments including a plurality of second user devices, as discussed herein, the system may cause the first user device to display a plurality of icons respectively corresponding to the plurality of second user devices. For example, the first user device may establish a wireless connection with five second user devices. In such a case, the system may cause the first user device to display, via the GUI, an icon respectively corresponding to those five second user devices.

In block 106, the user tracking system 320 may track a location of the second user device relative to the first user device. For example, the system may receive and track a Global Positioning System (GPS) signal associated with the first and second user devices. In some embodiments including a plurality of second user devices, as discussed herein, the system may track respective locations of the plurality of second user devices relative to the first user device. In some embodiments, tracking the location of a device(s) may be conducted via an ultra-wideband technology such that the system may track respective locations of devices relative to one another, as discussed herein.

In block 108, the user tracking system 320 may modify the GUI by repositioning the first icon in the GUI based on the location of the second user device relative to the first user device. For example, as the second user device location changes (e.g., by a user of the second user device moving around a space), the system may continuously modify the GUI by repositioning the icon associated with the second user device within the GUI such that the first user may observe how the second user's location is continuously changing in real-time relative to the first user's location. In some embodiments including a plurality of second user devices, as discussed herein, the system may modify the GUI by repositioning one or more of the plurality of icons in the GUI based on the respective locations of each second user device relative to the first user device.

In block 110, the user tracking system 320 may cause the first user device to display the modified GUI. For example, the system may cause the first user device to dynamically display the modified GUI such that the first user may observe how each of the second user device locations is changing in real-time relative to the location of the first user device. For example, a parent holding a first user device and sitting in the living room of a home may track the respective locations of three children in the room by observing how each child's respective associated icon moves around within the modified GUI. A benefit of this continuous GUI modification and display is that the first user (e.g., a parent) may ensure that data can be transferred to the correct second user (e.g., a child), as further discussed herein.

In block 112, the user tracking system 320 may receive a request, from the first user device, to transfer data to the second user device based on a current position of the first icon in the modified GUI. In some embodiments, the request may include a selection of a user input within a GUI of the first user device, such as a selection of a drop-down menu or radio button, or a typing in of a text box. For example, the first user may access a mobile application via the first user device, wherein the mobile application may include one or more data transfer functions, e.g., the generation and sharing of a virtual card number. In some embodiments, the request may include a gesture conducted by the user of the first user device within the modified GUI. For example, the first user may request the generation of a new virtual card number, e.g., a proxy number financially backed by the first user's primary account number, and configured with one or more transaction restrictions (e.g., time, use, amount, geographic, merchant type, etc.). The system may be configured to generate the new virtual card number and display it via the GUI such that the first user may interact with the virtual card number and/or an icon associated with the virtual card number (e.g., an icon of a credit card) within the GUI. For example, the first user may be able to click on and drag the virtual card number and/or its associated icon in the direction of a specific second user's associated icon (e.g., avatar) displayed in the modified GUI. The first user may then be able to drop the virtual card number and/or its associated icon once it overlaps with the desired second user icon such that the first user can ensure the virtual card number is transferred to the correct second user, as further discussed herein.

In some embodiments, the first user device may include an augmented reality (AR) device, such as an AR headset. In such a case, the system may receive the request to transfer the data from the first user by sensing the first user, e.g., wearing or holding the AR device, pointing or aiming the AR device in the direction of a second user's associated icon within the virtual display. Alternatively, or in addition, the system may receive the request to transfer the data by sensing the first user scan a space (e.g., around a room) with the AR device (e.g., AR glasses), and tap on the AR device when the device is pointing or aiming in the direction of the second user.

In optional block 114, responsive to receiving the request, the user tracking system 320 may cause the first user device to display, via the modified GUI, a second icon corresponding to the data. For example, as discussed above, once the first user initially requests a data transfer (e.g., a generation and sharing of a virtual card number), the system may be configured to display, via the modified GUI, an icon corresponding to the virtual card number, such as an image of a credit card.

In optional block 116, the user tracking system 320 may receive a user input from the first user device via the modified GUI, the user input comprising a movement of the second icon in a direction of the current position of the first icon corresponding to the second user device. For example, as discussed above, the system may be configured to provide a drag and drop feature within the modified GUI such that the first user may click on and drag the icon (e.g., of a credit card) in the direction of a desired second user's associated icon.

In block 118, responsive to receiving the request, the user tracking system 320 may transfer the data to the second user device. In some embodiments, the system may be configured to transfer the data to the second user device, for example, by transferring the data via a secure channel within a shared mobile application, linked financial accounts, linked local storage locations, a shared public key, and the like. In some embodiments, prior to the system transferring the data to the second user device, the system may be configured to generate and transmit for display to the first and/or second user device a notification indicating the upcoming data transfer. The system may be configured to provide the first and/or second user with a prompt to, e.g., accept, deny, or request modification to the data transfer. For example, a parent may wish to transfer a virtual card number to a child, the virtual card number having a transaction amount limit of $50. When the parent initiates the transfer request, the system may be configured to generate and cause the first user device to display a notification requesting the first user (e.g., a parent) confirm the transfer (e.g., a pop-up notification that states: "Are you sure?"). Alternatively, or in addition, the system may be configured to generate and cause the second user device to display a notification requesting the second user (e.g., a child) confirm receipt of the transfer and/or requesting the second user indicate whether he or she would prefer to modify the data transfer. In the case of such modification request, the system may be configured to generate and cause the first user device to display an additional notification indicating the second user's modification preference (e.g., to increase the transaction amount limit to $75) such that the first user may respond. A benefit of such notifications is that a first and second user may conduct a form of negotiation to, for example, land on an agreed upon type, amount, format, etc., of data to be transferred.

Figure 2:
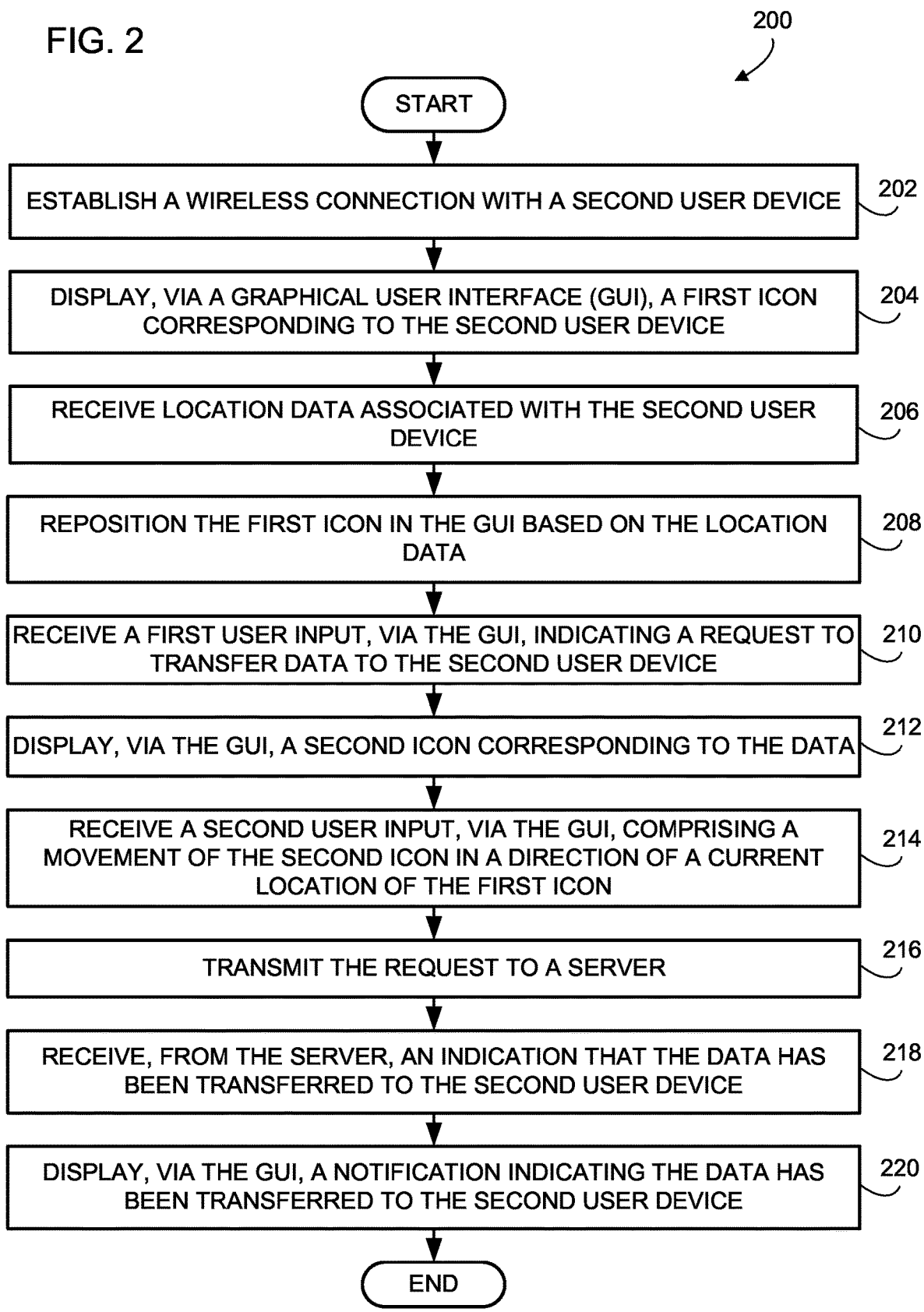
FIG. 2 is a flow diagram illustrating an exemplary method for sharing data in accordance with certain embodiments of the disclosed technology.

FIG. 2 is a flow diagram illustrating an exemplary method 200 for sharing data, in accordance with certain embodiments of the disclosed technology. The steps of method 200 may be performed by one or more components of the system 400 (e.g., user device 402 and/or user device(s) 404), as described in more detail with respect to FIGS. 3 and 4.

Method 200 of FIG. 2 may be the same as or similar to method 100 of FIG. 1, except that method 200 may be performed from the perspective of a user device (e.g., user device 402). The respective descriptions of blocks 202, 204, 206, 208, 210, 212, and 214 of method 200 may be the same as or similar to the respective descriptions of blocks 102, 104, 106, 108, 112, 114, and 116 of method 100, except blocks 202, 204, 206, 208, 210, 212, and 214 of method 200 may be performed by a user device (e.g., user device 402). As such, blocks 202, 204, 206, 208, 210, 212, and 214 are not described herein for brevity. Method 200, however, also includes blocks 216, 218, and 220, which are described below.

In block 216, responsive to receiving the second user input, the user device 402 may transmit the request to a server. For example, the first user device (e.g., user device 402) may transmit the request (e.g., to transfer data to a second user device) to a server owned and/or operated by data sharing system 408, as further described below with respect to FIG. 4.

In block 218, the user device 402 may receive, from the server, an indication that the data has been transferred to the second user device. For example, upon the server facilitating or conducting the transfer of data from the first user device (e.g., user device 402) to the second user device (e.g., user device 404), the first user device may receive an indication that the data has been transferred to the second user device as requested.

In block 220, responsive to receiving the indication, the user device 402 may display, via the GUI, a notification indicating the data has been transferred to the second user device. For example, the user device 402 may display a pop-up notification, via the GUI, alerting the first user that the data has been successfully transferred to the second user device as requested.

Figure 3:
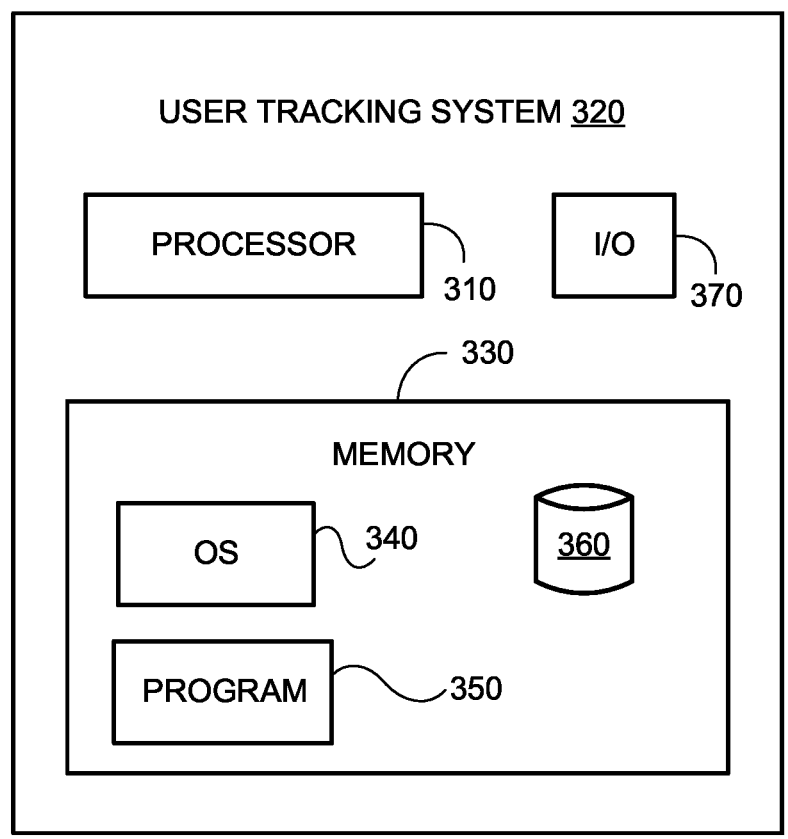
FIG. 3 is block diagram of an example user tracking system used to share data, according to an example implementation of the disclosed technology.
Figure 4:
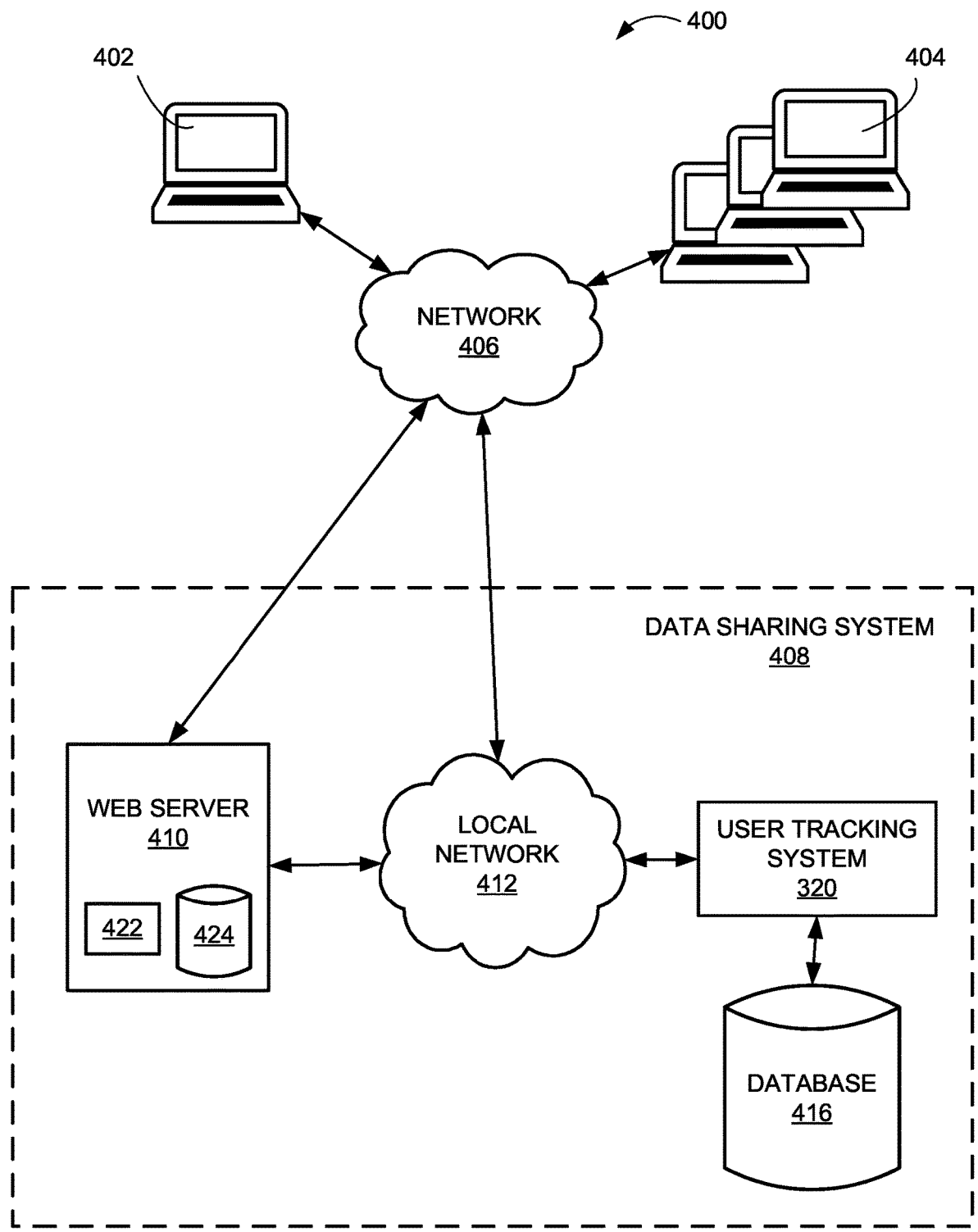
FIG. 4 is block diagram of an example system that may be used to share data, according to an example implementation of the disclosed technology.

FIG. 3 is a block diagram of an example user tracking system 320 used to share data according to an example implementation of the disclosed technology. According to some embodiments, the user device 402 and web server 410, as depicted in FIG. 4 and described below, may have a similar structure and components that are similar to those described with respect to user tracking system 320 shown in FIG. 3. As shown, the user tracking system 320 may include a processor 310, an input/output (I/O) device 370, a memory 330 containing an operating system (OS) 340 and a program 350.

In certain example implementations, the user tracking system 320 may be a single server or may be configured as a distributed computer system including multiple servers or computers that interoperate to perform one or more of the processes and functionalities associated with the disclosed embodiments. In some embodiments user tracking system 320 may be one or more servers from a serverless or scaling server system. In some embodiments, the user tracking system 320 may further include a peripheral interface, a transceiver, a mobile network interface in communication with the processor 310, a bus configured to facilitate communication between the various components of the user tracking system 320, and a power source configured to power one or more components of the user tracking system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), NFC, Bluetooth™ low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the user tracking system 320 may include one or more storage devices configured to store information used by the processor 310 (or other components) to perform certain functions related to the disclosed embodiments. In one example, the user tracking system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The user tracking system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the user tracking system 320 may include the memory 330 that may include one or more programs 350 to perform one or more functions of the disclosed embodiments. For example, in some embodiments, the user tracking system 320 may additionally manage dialogue and/or other interactions with the customer via a program 350.

The processor 310 may execute one or more programs 350 located remotely from the user tracking system 320. For example, the user tracking system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a fraud detection system database 360 for storing related data to enable the user tracking system 320 to perform one or more of the processes and functionalities associated with the disclosed embodiments.

The user tracking system database 360 may include stored data relating to status data (e.g., average session duration data, location data, idle time between sessions, and/or average idle time between sessions) and historical status data. According to some embodiments, the functions provided by the user tracking system database 360 may also be provided by a database that is external to the user tracking system 320, such as the database 416 as shown in FIG. 4.

The user tracking system 320 may also be communicatively connected to one or more memory devices (e.g., databases) locally or through a network. The remote memory devices may be configured to store information and may be accessed and/or managed by the user tracking system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The user tracking system 320 may also include one or more I/O devices 370 that may comprise one or more interfaces for receiving signals or input from devices and providing signals or output to one or more devices that allow data to be received and/or transmitted by the user tracking system 320. For example, the user tracking system 320 may include interface components, which may provide interfaces to one or more input devices, such as one or more keyboards, mouse devices, touch screens, track pads, trackballs, scroll wheels, digital cameras, microphones, sensors, and the like, that enable the user tracking system 320 to receive data from a user (such as, for example, via the user device 402).

In examples of the disclosed technology, the user tracking system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the user tracking system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the user tracking system 320 may include a greater or lesser number of components than those illustrated.

FIG. 4 is a block diagram of an example system that may be used to view and interact with data sharing system 408, according to an example implementation of the disclosed technology. The components and arrangements shown in FIG. 4 are not intended to limit the disclosed embodiments as the components used to implement the disclosed processes and features may vary. As shown, data sharing system 408 may interact with a user device 402 and/or a user device(s) 404 via a network 406. In certain example implementations, the data sharing system 408 may include a local network 412, a user tracking system 320, a web server 410, and a database 416.

In some embodiments, a respective user may operate the user device 402 and user device(s) 404. The user device 402 and/or user device(s) 404 can include one or more of a mobile device, smart phone, general purpose computer, tablet computer, laptop computer, telephone, public switched telephone network (PSTN) landline, smart wearable device, voice command device, AR device, other mobile computing device, or any other device capable of communicating with the network 406 and ultimately communicating with one or more components of the data sharing system 408. In some embodiments, the user device 402 and/or user device(s) 404 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the data sharing system 408. According to some embodiments, the user device 402 and/or user device(s) 404 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The user tracking system 320 may include programs (scripts, functions, algorithms) to configure data for visualizations and provide visualizations of datasets and data models on the user device 402 and/or user device(s) 404. This may include programs to generate graphs and display graphs. The user tracking system 320 may include programs to generate histograms, scatter plots, time series, or the like on the user device 402 and/or user device(s) 404. The user tracking system 320 may also be configured to display properties of data models and data model training results including, for example, architecture, loss functions, cross entropy, activation function values, embedding layer structure and/or outputs, convolution results, node outputs, or the like on the user device 402 and/or user device(s) 404.

The network 406 may be of any suitable type, including individual connections via the internet such as cellular or WiFi networks. In some embodiments, the network 406 may connect terminals, services, and mobile devices using direct connections such as RFID, NFC, Bluetooth™ BLE, WiFi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The data sharing system 408 may be associated with and optionally controlled by one or more entities such as a business, corporation, individual, partnership, or any other entity that provides one or more of goods, services, and consultations to individuals such as customers. In some embodiments, the data sharing system 408 may be controlled by a third party on behalf of another business, corporation, individual, partnership. The data sharing system 408 may include one or more servers and computer systems for performing one or more functions associated with products and/or services that the organization provides.

Web server 410 may include a computer system configured to generate and provide one or more websites accessible to customers, as well as any other individuals involved in accessing data sharing system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402 and/or user device(s) 404. For example, web server 410 may host a financial service provider website that a user device may access by providing an attempted login that are authenticated by the user tracking system 320. According to some embodiments, web server 410 may include software tools, similar to those described with respect to user device 402 and/or user device(s) 404 above, that may allow web server 410 to obtain network identification data from user device 402 and/or user device(s) 404. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the data sharing system 408 to interact with one another and to connect to the network 406 for interacting with components in the system 400 environment. In some embodiments, the local network 412 may include an interface for communicating with or linking to the network 406. In other embodiments, certain components of the data sharing system 408 may communicate via the network 406, without a separate local network 406.

The data sharing system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 and/or user device(s) 404 may be able to access data sharing system 408 using the cloud computing environment. User device 402 and/or user device(s) 404 may be able to access data sharing system 408 using specialized software. The cloud computing environment may eliminate the need to install specialized software on user device 402 and/or user device(s) 404.

In accordance with certain example implementations of the disclosed technology, the data sharing system 408 may include one or more computer systems configured to compile data from a plurality of sources the user tracking system 320, web server 410, and/or the database 416. The user tracking system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

EXAMPLE USE CASE

The following example use case describes an example of a typical user flow pattern. This section is intended solely for explanatory purposes and not in limitation.

In one example, a parent may be sitting in her kitchen along with her three children. The parent and three children may each have their own mobile device connected to the local (e.g., house) wireless network. One child may be using her mobile device to conduct online shopping; another child may be using his mobile device to play video games, etc. Within a GUI of the parent's mobile device, she may be able to track the location of each of the three children in the kitchen. For example, the GUI may display a first icon, e.g., an avatar, associated with a first child on the left side of the GUI. This icon placement may resemble the location of that first child in the kitchen relative to the parent (e.g., sitting in a chair to the parent's left). The GUI may display a second icon associated with a second child in the top and center of the GUI, resembling the location of that second child being directly in front of the parent. Finally, the GUI may display a third icon associated with a third child, Alice, on the right side of the GUI, resembling the location of Alice being to the right of the parent. As the children move about the kitchen, their respective icons may move about the GUI such that the parent can continuously track the exact locations of each child in real-time.

The parent may wish to allow Alice to go online and purchase new clothing for the upcoming school year. As such, the parent may decide to provide Alice with a virtual card number, where the virtual card number is a proxy number for the parent's primary account number, and includes one or more restrictions, such as a transaction amount limit of $100 and a merchant category restriction such that the virtual card number may only be used at merchants that sell clothing. The parent may log into a mobile application and input a request to generate a new virtual card number with the above-mentioned limitations. An icon corresponding to the new virtual card number (e.g., a credit card icon) may then be displayed via the GUI of the parent's mobile device.

When the parent is ready to transfer the newly generated virtual card number to Alice, the parent can check the GUI display to determine where Alice's associated icon (e.g., avatar) is currently located. For example, Alice may currently be standing in front of the refrigerator directly in front of the parent. As such, Alice's icon may now be displayed in the top and center of the GUI. The parent can click on or tap the credit card icon, and drag the icon until it is hovering over Alice's avatar in the top and center of the GUI. At that point, the GUI may display some type of indication that the credit card icon is lined up with Alice's avatar. For example, a green bold border may appear around both the credit card icon and Alice's avatar. The parent can then drop (or release) the credit card icon. At that point, a notification may be displayed in the GUI confirming the virtual card number was successfully transferred to Alice. Finally, Alice may receive the virtual card number, for example via an in-application message inbox, such that when Alice initiates an online transaction to purchase clothing, she may be able to enter or apply the virtual card number at checkout.

In some examples, disclosed systems or methods may involve one or more of the following clauses:

Clause 1: A system comprising: one or more processors; and a memory in communication with the one or more processors and storing instructions that, when executed by the one or more processors, are configured to cause the system to: direct a first user device to establish a respective wireless connection with a plurality of second user devices; cause the first user device to display, via a graphical user interface (GUI), a plurality of icons respectively corresponding to the plurality of second user devices; track respective locations of the plurality of second user devices relative to the first user device; modify the GUI by repositioning one or more of the plurality of icons in the GUI based on the respective locations of each second user device relative to the first user device; cause the first user device to display the modified GUI; receive a request, from the first user device, to transfer data to a second user device of the plurality of second user devices based on a current position of an icon associated with the second user device in the modified GUI; and responsive to receiving the request, transfer the data to the second user device.

Clause 2: The system of clause 1, wherein the instructions are further configured to cause the system to: responsive to receiving the request, cause the first user device to display, via the modified GUI, a second icon corresponding to the data; receive a user input from the first user device via the modified GUI, the user input comprising a movement of the second icon in a direction of the current position of the icon associated with the second user device; and responsive to receiving the user input, transfer the data to the second user device.

Clause 3: The system of clause 1, wherein the request comprises a gesture conducted by a user of the first user device within the modified GUI.

Clause 4: The system of clause 3, wherein the gesture comprises a drag and drop function.

Clause 5: The system of clause 1, wherein the first user device comprises an augmented reality (AR) device.

Clause 6: The system of clause 1, wherein the plurality of icons each comprise an image respectively corresponding to a user associated with the plurality of second user devices.

Clause 7: The system of clause 1, wherein the data comprises transaction card data.

Clause 8: The system of clause 1, wherein tracking the respective locations of the plurality of second user devices is conducted via an ultra-wideband technology.

Clause 9: The system of clause 1, wherein the respective wireless connection comprises an encrypted channel.

Clause 10: A system comprising: one or more processors; and a memory in communication with the one or more processors and storing instructions that, when executed by the one or more processors, are configured to cause the system to: direct a first user device to establish a wireless connection with a second user device; cause the first user device to display, via a graphical user interface (GUI), a first icon corresponding to the second user device; track a location of the second user device relative to the first user device; modify the GUI by repositioning the first icon in the GUI based on the location of the second user device relative to the first user device; cause the first user device to display the modified GUI; receive a request, from the first user device, to transfer data to the second user device based on a current position of the first icon in the modified GUI; responsive to receiving the request, cause the first user device to display, via the modified GUI, a second icon corresponding to the data; receive a user input from the first user device via the modified GUI, the user input comprising a movement of the second icon in a direction of the current position of the first icon corresponding to the second user device; and responsive to receiving the user input, transfer the data to the second user device.

Clause 11: The system of clause 10, wherein the first user device comprises an augmented reality (AR) device.

Clause 12: The system of clause 10, wherein the first icon comprises an image corresponding to a user associated with the second user device.

Clause 13: The system of clause 10, wherein the data comprises transaction card data.

Clause 14: The system of clause 10, wherein tracking the location of the second user device is conducted via an ultra-wideband technology.

Clause 15: The system of clause 10, wherein the wireless connection comprises an encrypted channel.

Clause 16: A first user device comprising: one or more processors; and a memory in communication with the one or more processors and storing instructions that, when executed by the one or more processors, are configured to cause the first user device to: establish a wireless connection with a second user device; display, via a graphical user interface (GUI), a first icon corresponding to the second user device; receive location data associated with the second user device; reposition the first icon in the GUI based on the location data; receive a first user input, via the GUI, indicating a request to transfer data to the second user device; responsive to receiving the first user input, display, via the GUI, a second icon corresponding to the data; receive a second user input, via the GUI, comprising a movement of the second icon in a direction of a current location of the first icon; responsive to receiving the second user input, transmit the request to a server; receive, from the server, an indication that the data has been transferred to the second user device; and responsive to receiving the indication, display, via the GUI, a notification indicating the data has been transferred to the second user device.

Clause 17: The first user device of clause 16, wherein the first user device comprises an augmented reality (AR) device.

Clause 18: The first user device of clause 16, wherein the data comprises transaction card data.

Clause 19: The first user device of clause 16, wherein the first icon comprises an image corresponding to a user associated with the second user device.

Clause 20: The first user device of clause 16, wherein the wireless connection comprises an encrypted channel.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:
1. A system comprising:
one or more processors; and
a memory in communication with the one or more processors and storing instructions that, when executed by the one or more processors, are configured to cause the system to:

direct a first user device to establish a respective wireless connection with a plurality of second user devices;

cause the first user device to display, via a graphical user interface (GUI), a plurality of icons respectively corresponding to the plurality of second user devices;

continuously track a respective location of each second user device of the plurality of second user devices relative to the first user device and to each of the other second user devices of the plurality of second user devices;

receive a respective Global Positioning System (GPS) signal associated with each second user device of the plurality of second user devices;

continuously track a respective position of each second user device of the plurality of second user devices within a physical space based on the received respective GPS signal;

dynamically modify the GUI by continuously repositioning one or more of the plurality of icons in the GUI within a map of the physical space based on the respective location and position of each second user device;

cause the first user device to display the modified GUI comprising the map;

receive a request, from the first user device, to transfer data to a second user device of the plurality of second user devices based on a current placement of an icon associated with the second user device in the modified GUI; and responsive to receiving the request, transfer the data to the second user device.

2. The system of claim 1, wherein the instructions are further configured to cause the system to:

responsive to receiving the request, cause the first user device to display, via the modified GUI, a second icon corresponding to the data;

receive a user input from the first user device via the modified GUI, the user input comprising a movement of the second icon in a direction of the current placement of the icon associated with the second user device; and responsive to receiving the user input, transfer the data to the second user device.

3. The system of claim 1, wherein the request comprises a gesture conducted by a user of the first user device within the modified GUI.

4. The system of claim 3, wherein the gesture comprises a drag and drop function.

5. The system of claim 1, wherein the first user device comprises an augmented reality (AR) device.

6. The system of claim 1, wherein the plurality of icons each comprise an image respectively corresponding to a user associated with the plurality of second user devices.

7. The system of claim 1, wherein the data comprises transaction card data.

8. The system of claim 1, wherein tracking the respective location of each second user device of the plurality of second user devices is conducted via an ultra-wideband technology.

9. The system of claim 1, wherein the respective wireless connection comprises an encrypted channel.

10. A system comprising:
one or more processors; and
a memory in communication with the one or more processors and storing instructions that, when executed by the one or more processors, are configured to cause the system to:

direct a first user device to establish a wireless connection with one or more second user devices;

cause the first user device to display, via a graphical user interface (GUI), a respective first icon corresponding to each of the one or more second user devices;

continuously track a respective location of each second user device of the one or more second user devices relative to the first user device;

receive a respective Global Positioning System (GPS) signal associated with each second user device of the one or more second user devices;

continuously track a respective position of each second user device of the one or more second user devices within a physical space based on the received respective GPS signal;

dynamically modify the GUI by continuously repositioning the respective first icon in the GUI within a map of the physical space based on the respective location and position of each second user device;

cause the first user device to display the modified GUI comprising the map;

receive a request, from the first user device, to transfer data to a second user device of the one or more second user devices based on a current placement of the respective first icon of the second user device in the modified GUI;

responsive to receiving the request, cause the first user device to display, via the modified GUI, a second icon corresponding to the data;

receive a user input from the first user device via the modified GUI, the user input comprising a movement of the second icon in a direction of the current placement of the respective first icon corresponding to the second user device; and responsive to receiving the user input, transfer the data to the second user device.

11. The system of claim 10, wherein the first user device comprises an augmented reality (AR) device.

12. The system of claim 10, wherein the respective first icon comprises an image corresponding to a user associated with the second user device.

13. The system of claim 10, wherein the data comprises transaction card data.

14. The system of claim 10, wherein tracking the respective location of each second user device is conducted via an ultra-wideband technology.

15. The system of claim 10, wherein the wireless connection comprises an encrypted channel.

16. A first user device comprising:
one or more processors; and
a memory in communication with the one or more processors and storing instructions that, when executed by the one or more processors, are configured to cause the first user device to:

establish a wireless connection with one or more second user devices;

display, via a graphical user interface (GUI), a respective first icon corresponding to each of the one or more second user devices;

continuously receive location data associated with the one or more second user devices thereby tracking a respective position of the one or more second user devices within a physical space;

dynamically reposition the respective first icon in the GUI within a map of the physical space based on the location data;

dynamically display the map via the GUI;

receive a first user input, via the GUI, indicating a request to transfer data to a second user device of the one or more second user devices;

responsive to receiving the first user input, display, via the GUI, a second icon corresponding to the data;

receive a second user input, via the GUI, comprising a movement of the second icon in a direction of a current placement of the respective first icon in the GUI;

responsive to receiving the second user input, transmit the request to a server;

receive, from the server, an indication that the data has been transferred to the second user device; and responsive to receiving the indication, display, via the GUI, a notification indicating the data has been transferred to the second user device.

17. The first user device of claim 16, wherein the first user device comprises an augmented reality (AR) device.

18. The first user device of claim 16, wherein the data comprises transaction card data.

19. The first user device of claim 16, wherein the respective first icon comprises an image corresponding to a user associated with the second user device.

20. The first user device of claim 16, wherein the wireless connection comprises an encrypted channel.

* * * * *